(12) United States Patent
Nishimori et al.

(10) Patent No.: US 9,667,931 B2
(45) Date of Patent: May 30, 2017

(54) ELECTRO-OPTIC APPARATUS AND CONTROL METHOD THEREOF

(71) Applicant: SEIKO EPSON CORPORATION, Tokyo (JP)

(72) Inventors: Takashi Nishimori, Matsumoto (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/099,163

(22) Filed: Apr. 14, 2016

(65) Prior Publication Data

US 2016/0366383 A1  Dec. 15, 2016

(30) Foreign Application Priority Data

Jun. 15, 2015  (JP) ................. 2015-120610

(51) Int. Cl.
*H04N 9/31* (2006.01)

(52) U.S. Cl.
CPC ........... *H04N 9/3188* (2013.01); *H04N 9/312* (2013.01)

(58) Field of Classification Search
CPC .... H04N 9/3188; H04N 9/312; H04N 9/3197; H04N 9/3129; H04N 9/3141; H04N 9/31; H04N 9/3102; G09G 2340/0407; G09G 3/007

USPC ....... 348/739, 744–747, 750, 751, 790, 441; 345/204, 690, 698, 82, 85, 87, 89
IPC ...................... H04N 9/12,9/31, 3/22, 3/26, 7/01
See application file for complete search history.

(56) References Cited

U.S. PATENT DOCUMENTS

| | | | |
|---|---|---|---|
| 2002/0063807 A1* | 5/2002 | Margulis | G06T 1/20 348/745 |
| 2010/0103206 A1* | 4/2010 | Kamada | G09G 3/3607 345/690 |

FOREIGN PATENT DOCUMENTS

JP          2616652 B2    6/1997

* cited by examiner

*Primary Examiner* — Sherrie Hsia

(57) ABSTRACT

A projector includes a liquid crystal panel, an optical path shifting element which is capable of changing the optical path of light emitted from the liquid crystal panel, and an image processing unit. The optical path shifting element performs pixel shift such that light reaches different positions of a display screen in respective first to fourth unit periods acquired by dividing one frame into four parts. The image processing unit includes a conversion unit which converts a high resolution image signal into a low resolution image signal, and generates an output image signal by performing an overdrive process on the low resolution image signal according to a pixel shift state.

7 Claims, 13 Drawing Sheets

FIG. 10

| FIELD NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PIXEL SHIFT STATE | A | A | A | A | B | B | B | B | C | C | C | C | D | D | D | D |
| POLARITY OF VOLTAGE WHICH IS APPLIED TO LIQUID CRYSTAL | + | − | + | − | + | − | + | − | + | − | + | − | + | − | + | − |
| VALIDITY/ INVALIDITY OF OVERDRIVE PROCESSING | ON | ON | OFF | OFF | OFF | OFF | OFF | OFF | OFF | OFF | OFF | OFF | OFF | OFF | OFF | OFF |

Ta: fields 1–4, Tb: fields 5–8, Tc: fields 9–12, Td: fields 13–16 — ONE FRAME

FIG. 13

| FIELD NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PIXEL SHIFT STATE | A | A | A | A | B | B | B | B | C | C | C | C | D | D | D | D |
| POLARITY OF VOLTAGE WHICH IS APPLIED TO LIQUID CRYSTAL | + | - | + | - | + | - | + | - | + | - | + | - | + | - | + | - |
| VALIDITY/ INVALIDITY OF OVERDRIVE PROCESSING | OFF | OFF | OFF | OFF | ON | ON | OFF | OFF | ON | ON | OFF | OFF | ON | ON | OFF | OFF |

Ta | Tb | Tc | Td

ONE FRAME

ELECTRO-OPTIC APPARATUS AND CONTROL METHOD THEREOF

BACKGROUND

1. Technical Field

The present invention relates to an electro-optic apparatus and a control method thereof.

2. Related Art

A liquid crystal display apparatus is provided such that, in a pair of substrates, pixel electrodes are arranged in the matrix shape for respective pixels on one substrate and a counter electrode is common to the respective pixels on the other substrate. Furthermore, liquid crystal is configured to be interposed between the pixel electrodes and the counter electrode. In the configuration, if a voltage according to grayscale to be displayed is applied and maintained between the pixel electrodes and the counter electrode, the orientation states of liquid crystal molecules are defined for the respective pixels. Therefore, the transmittance or the reflectance of the pixels is controlled. Generally, time is taken from when a voltage is applied to the liquid crystal to when the orientation states of the liquid crystal molecules are changed, and thus there are cases in which a response speed is low and a response is not ended during a writing time corresponding to a frame frequency in the liquid crystal display apparatus. In order to solve the problem, an overdrive process has been known which causes a response to be ended in one frame by comparing an image signal before one frame with an image signal of a current frame and compensating for a voltage which is higher (lower) than a drive voltage that is necessary for transition to a target transmittance (refer to Japanese Patent No. 2616652).

However, as a method of increasing pseudo-resolution, in a projector or the like, pixel shift is known in which an optical path shifting element that optically shifts a display position is used. In the pixel shift, one frame is divided into a plurality of unit periods, and the optical path shifting element is controlled such that pixel shift states are different from each other for the respective unit periods. If the above-described overdrive process is applied to the pixel shift without change, an image signal which is used for the overdrive process is generated based on an image signal, which is acquired by delaying an image signal to be input by one frame, and a current image signal.

However, in the pixel shift, an image signal which is supplied to a liquid crystal panel is generated for each unit period based on the input image signal. Accordingly, even when the overdrive process is performed based on the image signal to be input and an image signal before one frame thereof, there is a problem in that it is difficult to apply the overdrive process to the pixel shift.

SUMMARY

An advantage of some aspects of the invention is to provide an electro-optic apparatus to which pixel shift and an overdrive process are applied.

According to an aspect of the invention, there is provided an electro-optic apparatus including: an electro-optical panel in which a plurality of pixels are arranged; an optical path shifting element that is capable of changing an optical path of light which is emitted from the electro-optical panel; an optical path shifting element drive unit that drives the optical path shifting element such that, when one frame period of a high resolution image signal is divided into a plurality of unit periods which include a first unit period and a second unit period subsequent to the first unit period, and when it is assumed that a pixel shift state in which light emitted from a predetermined pixel of the electro-optical panel reaches a first position of a display screen is set to a first state and a pixel shift state in which light reaches a second position that is different from the first position of the display screen is set to a second state, the optical path shifting element enters the first state in the first unit period and enters the second state in the second unit period; and an image processing unit that converts the high resolution image signal into a low resolution image signal, and generates an output image signal which controls the plurality of pixels according to the low resolution image signal, in which the image processing unit performs an overdrive process which compensates for the response characteristics of the electro-optical panel according to the pixel shift state, and generates the output image signal.

According to the aspect, the optical path shifting element divides the one frame period of the high resolution image signal into the plurality of unit periods, and switches the pixel shift state for each unit period. Furthermore, since the output image signal is generated by performing the overdrive process which compensating for the response characteristics of the electro-optical panel according to the pixel shift state, it is possible to realize pseudo-high resolution due to the pixel shift and it is possible to improve the response characteristics of the electro-optical panel due to the overdrive process.

Here, the electro-optical panel is a panel in which the optical characteristics change according to electrical energy, and, for example, a liquid crystal panel corresponds thereto. In addition, "to compensate for response characteristics of the electro-optical panel" means to improve the response characteristics. For example, in a case in which the response delay time of the electro-optical panel is 10 ms, it is not necessary that the response delay time is 0 ms, and there is compensation for the response characteristics of the electro-optical panel if the response delay time is less than 10 ms. In addition, "to perform the overdrive process which compensates for the response characteristics of the electro-optical panel according to the pixel shift state" is a concept in which the overdrive process is not performed in a predetermined state in addition to that the content of the overdrive process is different.

In the electro-optic apparatus according to the aspect, it is preferable that the image processing unit includes a conversion unit that generates the low resolution image signal by performing conversion on the high resolution image signal; and an overdrive process unit that includes a low resolution image signal storage unit which stores the low resolution image signal output from the conversion unit, and generates the output image signal, on which the overdrive process is performed, based on the low resolution image signal of the target pixel which is the target of the overdrive process and the low resolution image signal of the target pixel in an immediately before pixel shift state which is read from the low resolution image signal storage unit, and a storage capacity of the low resolution image signal storage unit is smaller than a storage capacity for storing the high resolution image signal corresponding to one screen.

In order to compensate for the response characteristics of the electro-optical panel, it is necessary to understand a way that the electro-optical panel is driven in the immediately before image shift state. According to the aspect, it is possible to specify the low resolution image signal of the target pixel in the immediately before pixel shift state using the low resolution image signal storage unit which stores the low resolution image signal, and thus it is possible to appropriately perform the overdrive process.

In addition, the storage capacity of the low resolution image signal storage unit is smaller than the storage capacity of the high resolution image signal corresponding to one screen, and thus it is possible to largely reduce the storage capacity compared to a case in which the high resolution image signal is stored. That is, when the pixel shift is combined with the overdrive process, it is possible to reduce the storage capacity.

In the electro-optic apparatus according to the aspect, it is preferable that the low resolution image signal storage unit includes the storage capacity for storing the low resolution image signal corresponding to at least one screen. According to the aspect, it is possible to maintain the low resolution image signal corresponding to one screen, and thus it is possible to easily specify the low resolution image signal of the target pixel in the immediately before pixel shift state.

In the electro-optic apparatus according to the aspect, it is preferable that the image processing unit includes the conversion unit that generates the low resolution image signal by performing conversion on the high resolution image signal; and the overdrive process unit that performs the overdrive process, the overdrive process unit includes the low resolution image signal storage unit which stores the low resolution image signal output from the conversion unit; and an estimation unit that generates an estimated low resolution image signal which is read from the low resolution image signal storage unit and indicates grayscale to be displayed on the target pixel which is the target of the overdrive process in the immediately before pixel shift state based on the low resolution image signal of the target pixel which is the target of the overdrive process and the low resolution image signal of a pixel around the target pixel, the overdrive process unit generates the output image signal on which the overdrive process is performed based on the estimated low resolution image signal and the low resolution image signal of a current target pixel, and a storage capacity of the low resolution image signal storage unit is smaller than a storage capacity for storing the high resolution image signal corresponding to one screen.

In a case in which the high resolution image signal is converted into the low resolution image signal, content is changed to the low resolution image signal and the output image signal in a certain state of the pixel shift and a subsequent state of the pixel shift. Therefore, originally, it is necessary to store the low resolution image signal corresponding to one screen. In the aspect, the estimated low resolution image signal, which indicates grayscale to be displayed on the target pixel, is estimated in the state immediately before pixel shift state based on the target pixel which is the target of the overdrive process and the low resolution image signal of the pixel around the target pixel, and thus it is possible to largely reduce the storage capacity which stores the low resolution image signal. For example, if it is possible to store the low resolution image signal corresponding to at least two lines, estimation is possible.

In the electro-optic apparatus according to the aspect, it is preferable that the image processing unit includes a pre-overdrive process unit that performs a pre-overdrive process on the high resolution image signal; and a conversion unit that converts the high resolution image signal which is output from the pre-overdrive process unit into the low resolution image signal, and the pre-overdrive process is a process that is performed based on the high resolution image signal corresponding to the low resolution image signal of the target pixel and the high resolution image signal corresponding to the low resolution image signal which indicates grayscale to be displayed on the target pixel in the immediately before pixel shift state, and that is performed, if the high resolution image signal output from the pre-overdrive process unit is converted into the low resolution image signal in the conversion unit, to compensate for the response characteristics of the electro-optical panel according to the pixel shift state such that the pixel shift state enters a state in which the overdrive process is performed on the output image signal.

The low resolution image signal is generated by performing a process which performs conversion on resolution into the high resolution image signal. However, the low resolution image signal is generated according to the plurality of pixel shift states based on the high resolution image signal corresponding to one frame. The above-described aspect of the invention is focused on the low resolution image signal. According to the aspect, the high resolution image signal is converted into the low resolution image signal by performing the pre-overdrive process on the high resolution image signal in advance, and thus it is possible to generate the low resolution image signal on which the overdrive process is performed. In this case, the high resolution image signal in one frame is necessary in the pre-overdrive process, and thus it is possible to reduce the storage capacity which is necessary for the process.

In the electro-optic apparatus according to the aspect, the image processing unit includes a pre-overdrive process unit that performs a pre-overdrive process on the high resolution image signal; a conversion unit that converts the high resolution image signal output from the pre-overdrive process unit into the low resolution image signal; and an overdrive process unit that performs the overdrive process on the low resolution image signal output from the conversion unit, the pre-overdrive process is a process that is performed based on the high resolution image signal corresponding to the low resolution image signal of the target pixel and the high resolution image signal corresponding to the low resolution image signal which indicates grayscale to be displayed on the target pixel in the immediately before pixel shift state, and that is performed, if the high resolution image signal output from the pre-overdrive process unit is converted into the low resolution image signal in the conversion unit, to generate the high resolution image signal such that the output image signal, in which there is compensation for the response characteristics of the electro-optical panel according to the pixel shift state, is acquired, and the overdrive process is performed to generate the output image signal by compensating for the response characteristics of the electro-optical panel according to the pixel shift state based on the low resolution image signal of a pixel other than the target pixel and the low resolution image signal of the pixel in the immediately before pixel shift state.

According to the aspect, it is possible to perform the overdrive process on a pixel which is not the target of the pre-overdrive process. It is possible to improve the response characteristics of the electro-optical panel by exclusively performing the process. For example, the pre-overdrive process may be performed in-plane and the overdrive process may be performed out-of-plane. In this case, it is possible to reduce the storage capacity of the pre-overdrive process unit and it is possible to reduce the processing load of the overdrive process unit.

In addition, according to another aspect of the invention, it is possible to provide a method of controlling an electro-optic apparatus. According to the aspect, there is provided the method of controlling the electro-optic apparatus which includes an electro-optical panel in which a plurality of pixels are arranged, and an optical path shifting element that is capable of changing an optical path of light which is emitted from the electro-optical panel, the method including: driving the optical path shifting element such that, when one frame period of a high resolution image signal is divided into a plurality of unit periods which include a first unit period and a second unit period subsequent to the first unit period, and when it is assumed that a pixel shift state in which light emitted from a predetermined pixel of the electro-optical panel reaches a first position of a display screen is set to a first state, and a pixel shift state in which light reaches a second position that is different from the first position of the display screen is set to a second state, the optical path shifting element enters the first state in the first unit period and enters the second state in the second unit period; converting the high resolution image signal into a low resolution image signal; and generating an output image signal which controls the plurality of pixels by performing an overdrive process which compensates for a response characteristics of the electro-optical panel on the low resolution image signal according to the pixel shift state.

BRIEF DESCRIPTION OF THE DRAWINGS

The invention will be described with reference to the accompanying drawings, wherein like numbers reference like elements.

FIG. 10 is an explanatory diagram illustrating the operation of an overdrive process unit according to the second embodiment.

FIG. 13 is an explanatory diagram illustrating the relationship between a pixel shift state and each field according to the fourth embodiment.

DESCRIPTION OF EXEMPLARY EMBODIMENTS

Figure 1:
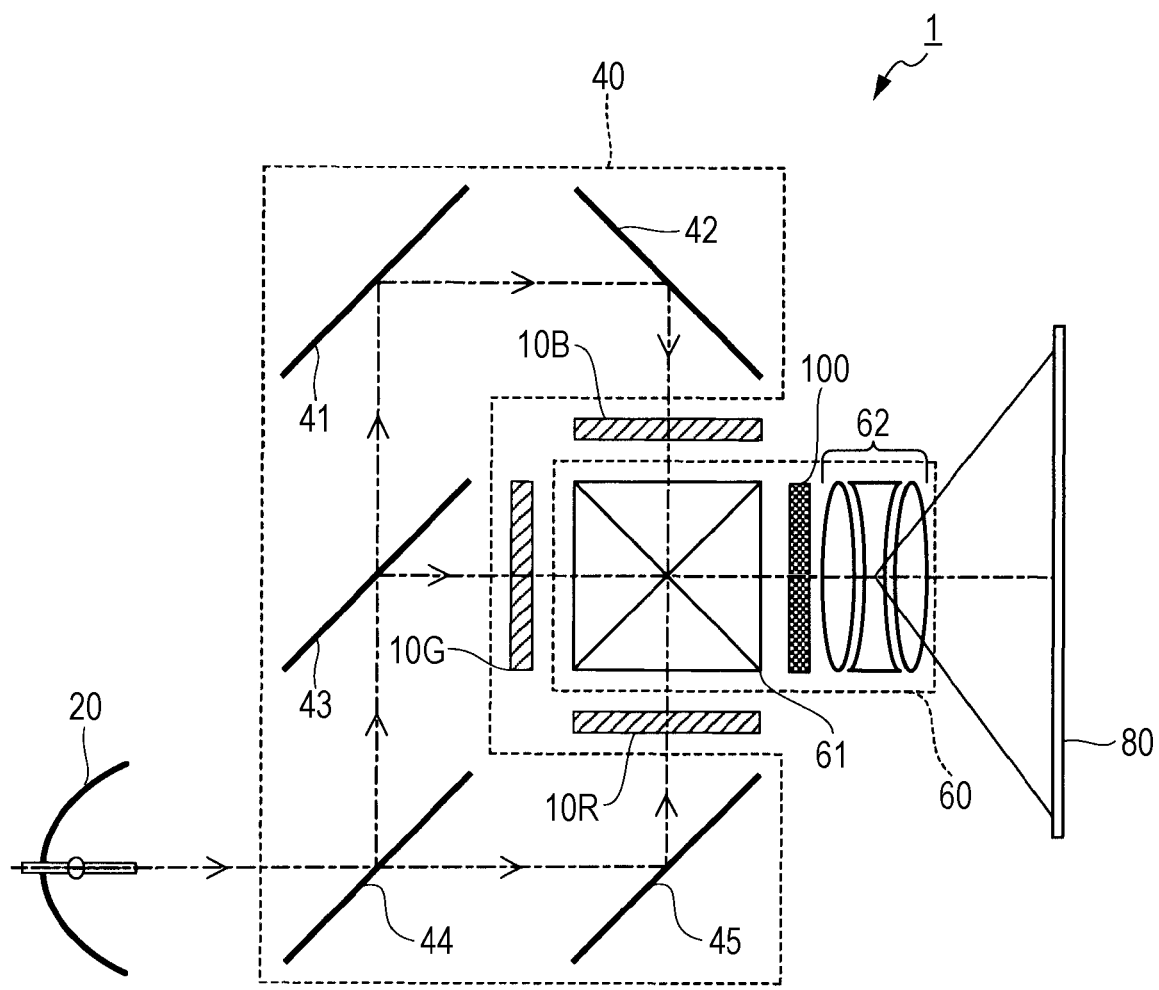
FIG. 1 is an explanatory diagram illustrating an example of the configuration of an optical system of a projector according to a first embodiment.

Various embodiments of the invention will be described with reference to the accompanying drawings. In the drawings, a ratio of the dimensions of each unit is appropriately different from an actual ratio.

First Embodiment

First, an example of the configuration of a projection type display apparatus (hereinafter, referred to as a projector) 1 according to a first embodiment of the invention will be described. FIG. 1 is an explanatory diagram illustrating an example of the configuration of the projector 1. In the projector 1, an overdrive process is employed and optical pixel shift, which will be described later, is performed, thereby reducing the storage capacity of a memory which is required for the overdrive process.

The projector 1 includes a lighting device 20, a separation optical system 40, three liquid crystal panels 10R, 10G, and 10B, and a projection optical system 60. The lighting device 20, which includes, for example, a white light source such as a halogen lamp, is provided inside the projector 1, and white light (visible light) which is emitted from the lighting device 20 is separated into three primary colors, that is, red (hereinafter, referred to as R), green (hereinafter, referred to as G), and blue (hereinafter, referred to as B) by three mirrors 41, 42, and 45 and dichroic mirrors 43 and 44 which are arranged therein, and guided into the respective liquid crystal panels 10R, 10G, and 10B corresponding to the three primary colors. The separation optical system 40 separates the white light which is emitted from the lighting device 20 into three primary colors, that is, R, G, and B.

Specifically, the dichroic mirror 44 causes light in an R wavelength region to pass therethrough and reflects light, in G and B wavelength regions, of the white light. The dichroic mirror 43 causes light in the B wavelength region to pass therethrough, and reflects light, in the G wavelength region, of light which is reflected by the dichroic mirror 44, in the G and B wavelength regions.

Here, the liquid crystal panels 10R, 10G, and 10B are respectively used as space light modulators. The liquid crystal panels 10R, 10G, and 10B include, for example, 800 rows of data lines and 600 columns of scan lines, and include pixels which are arranged in the matrix shape of 800 horizontal rows×600 vertical columns. In each pixel, the polarization state of emitting (transmitting) light for incident light is controlled according to grayscale. Meanwhile, the numbers of scan lines, data lines, and pixels of the above-described liquid crystal panels 10R, 10G, and 10B are examples, and the invention is not limited to the above-described example.

In the liquid crystal panels 10R, 10G, and 10B, pixel electrodes, which have approximately square shapes are provided to correspond to the intersections of the scan lines and the data lines, and common counter electrodes are provided to face the pixel electrode over the respective pixels. In addition, for example, liquid crystal of a VA method is provided between the pixel electrode and the counter electrode.

In such a configuration, the configuration is made such that, when a certain scan line is selected, a voltage of a data line corresponding to the pixel electrode is applied to a pixel electrode which is positioned in the selected scan line and the applied voltage is maintained by capacity, even when selection is cancelled.

Light which is modulated by the liquid crystal panels 10R, 10G, and 10B, respectively, is incident to a dichroic prism 61 from three directions. In the dichroic prism 61, R light and B light are refracted by 90° and G light travels in a straight direction, and thus respective R and B primary color images are synthesized.

On the emission side of the dichroic prism 61, an optical path shifting element 100 and a projection lens system 62 are sequentially arranged. The optical path shifting element 100 is an element which shifts emission light for incident light in a predetermined direction. An example of the detailed configuration of the optical path shifting element 100 will be described later with reference to FIG. 2.

The projection lens system 62 magnifies and projects light (synthesized image) which is emitted from the optical path shifting element 100 onto a projection surface 80 such as a screen. Meanwhile, light corresponding to the R, G, and B primary colors is incident into the relevant liquid crystal panels 10R, 10G, and 10B by the dichroic mirrors 43 and 44, and thus it is not necessary to provide color filters.

In addition, the transmission images of the liquid crystal panels 10R and 10B are reflected by the dichroic prism 61 and then projected onto the projection surface 80. In contrast, the transmission image of the liquid crystal panel 10G travels in a straight direction through the dichroic prism 61 and then projected. Therefore, the images which are formed by the liquid crystal panels 10R and 10B and the images which is formed by the liquid crystal panel 10G have an inverse rightward-leftward relationship.

As described above, the projection optical system 60 includes the dichroic prism 61, the optical path shifting element 100, and the projection lens system 62.

Figure 2:
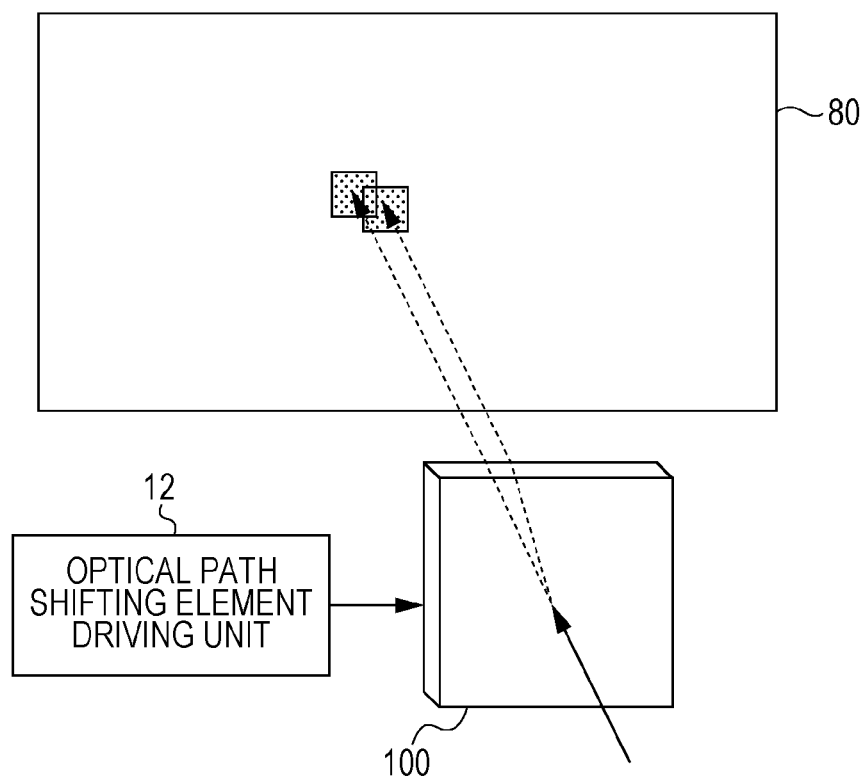
FIG. 2 is an explanatory diagram illustrating an example of the configuration of an optical path shifting element according to the first embodiment.

FIG. 2 is a diagram illustrating an example of the configuration of the optical path shifting element 100. The optical path shifting element 100 is driven based on the output signal of an optical path shifting element drive unit 12, and shifts the position of a pixel to be displayed by deviating the optical path of incident light. The shift of the position of the pixel is referred to as "pixel shift" in the description below. If the optical path of light which is emitted from the dichroic prism 61 is shifted by the optical path shifting element 100, a pixel is deviated (shifted) and then displayed on the projection surface 80 as illustrated in FIG. 2.

Figure 3:
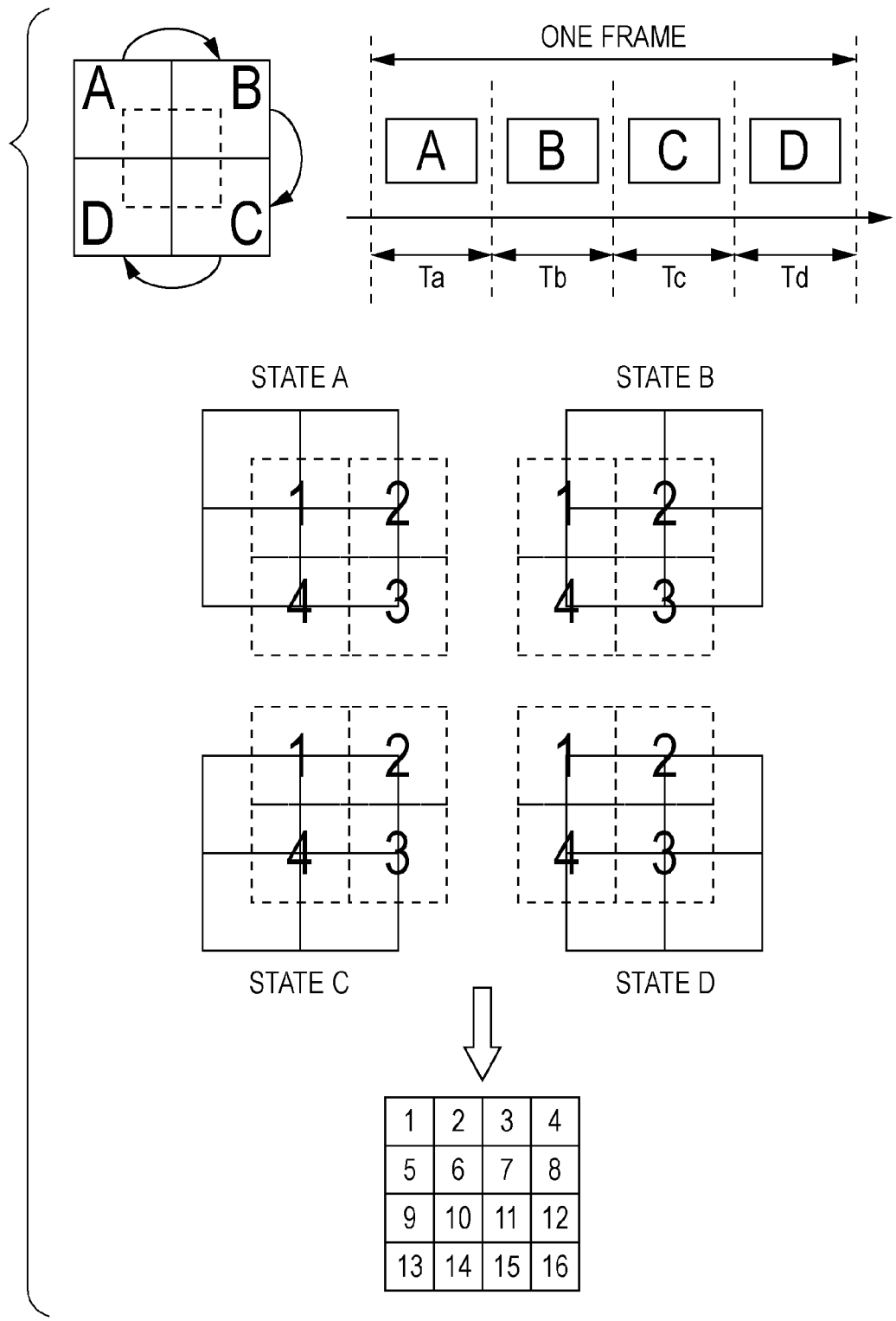
FIG. 3 is an explanatory diagram schematically illustrating the advantage of pixel shift according to the first embodiment.

FIG. 3 schematically illustrates an advantage of the pixel shift. In the pixel shift, light which is emitted from a low-resolution liquid crystal panel (electro-optical panel) is temporally deviated and projected, thereby increasing pseudo-resolution. In the example, projection is temporally performed in four directions, thereby outputting an image of 1600 horizontal pixels×1200 vertical pixels which corresponds to four times of a resolution of 800 horizontal pixels×600 vertical pixels. In the example, the pixel shift is performed clockwise while upper left part is assumed as a starting point. In FIG. 3, a display position, which is expressed by a dotted line, indicates a case in which the pixel shift is not performed. Further, one frame period is divided into four parts, and the pixel shift is performed to realize a state A which is shifted by ½ pixel pitch from the position of the dotted line to the upper left part in a first unit period Ta, a state B which is shifted by ½ pixel pitch from the position of the dotted line to the upper right in a second unit period Tb, a state C which is shifted by ½ pixel pitch from the position of the dotted line to the lower right in a third unit period Tc, and a state D which is shifted by ½ pixel pitch from the position of the dotted line to the lower left in a fourth unit period Td.

Figure 4:
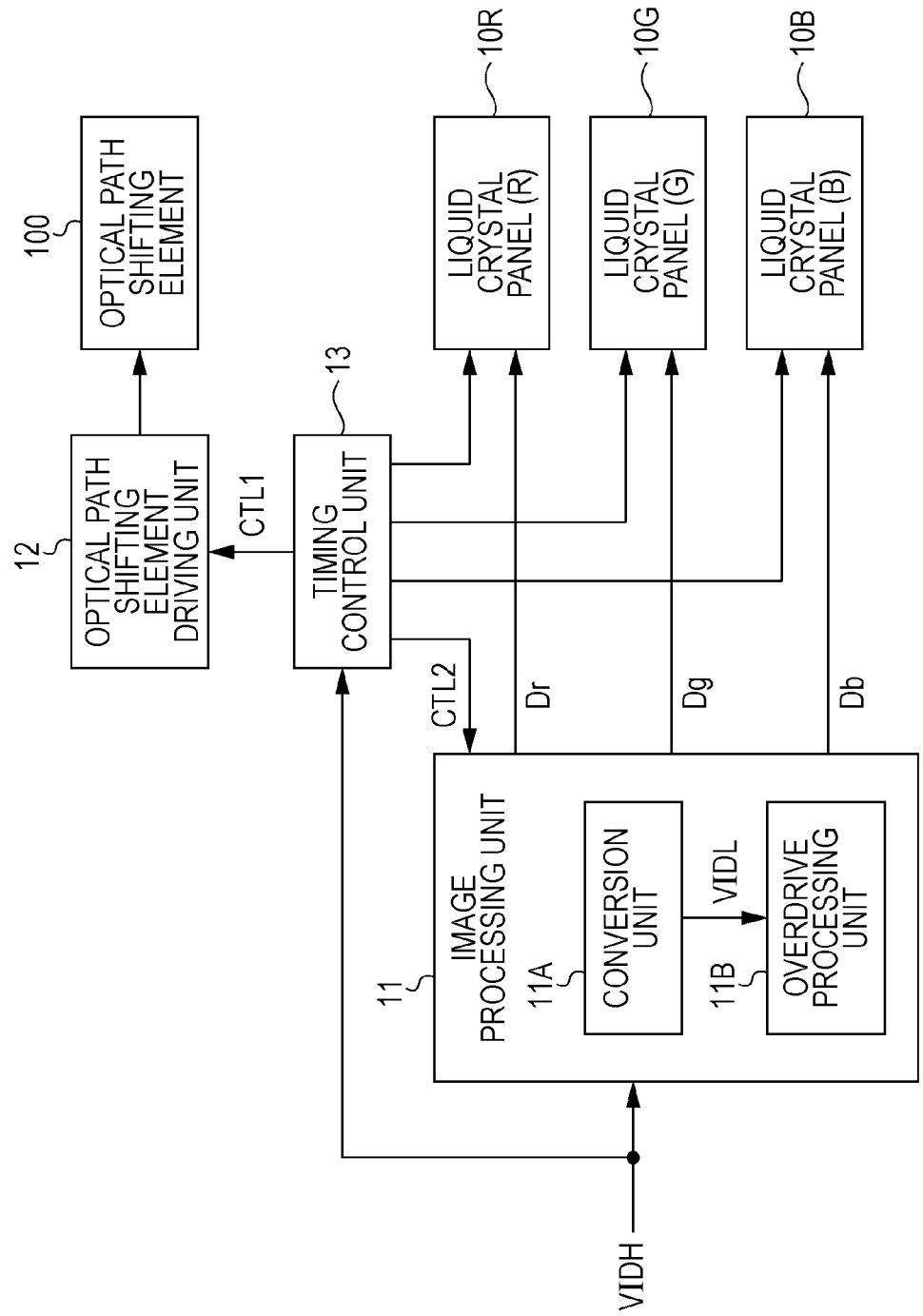
FIG. 4 is a block diagram illustrating an example of the configuration of a control system of the projector according to the first embodiment.

Hereinafter, the configuration of the control system of the projector 1 will be described. FIG. 4 is a block diagram illustrating an example of the configuration of the control system of the projector 1. As illustrated in the drawing, the projector 1 includes the liquid crystal panels 10R, 10G, and 10B, an image processing unit 11, a timing control unit 13, an optical path shifting element drive unit 12, and the optical path shifting element 100.

The image processing unit 11 includes a conversion unit 11A which converts a high resolution image signal VIDH into a low resolution image signal VIDL, and an overdrive process unit 11B which performs the overdrive process on the low resolution image signal VIDL, and generates output image signals Dr, Dg, and Db for driving the liquid crystal panels 10R, 10G, and 10B.

The optical path shifting element drive unit 12 drives the above-described optical path shifting element 100 based on a control signal CTL1 which is supplied from the timing control unit 13.

The timing control unit 13 generates a clock signal or the like in order to supply a data signal to the respective pixel electrodes of the liquid crystal panels 10R, 10G, and 10B, and supplies the clock signal to the data line drive circuits (not shown in the drawing) of the liquid crystal panels 10R, 10G, and 10B. In addition, the timing control unit 13 generates a control signal CTL1 which controls the optical path shifting element drive unit 12 and a control signal CTL2 which controls the overdrive process unit 11B based on the input high resolution image signal VIDH. Therefore, it is possible to control the overdrive process in synchronization with the pixel shift states A to D, which are described with reference to FIG. 3. Meanwhile, in the example, the timing control unit 13 performs various types of control based on the high resolution image signal VIDH. However, the timing control unit 13 may perform various types of control based on the low resolution image signal VIDL which is output from the conversion unit 11A.

Subsequently, the detailed configuration of the image processing unit 11 will be described with reference to FIG. 5. The conversion unit 11A converts a high resolution image signal VIDH of 60 Hz (in the example, 1600 horizontal pixels×1200 vertical pixels) into the low resolution image signal VIDL of 960 Hz (in the example, 800 horizontal pixels×600 vertical pixels). The conversion unit 11A includes a frame memory 111 which is capable of storing the high resolution image signal VIDH corresponding to one screen, performs a so-called down-conversion process using the frame memory 111, and generates the low resolution image signal VIDL of 960 Hz. Each of the high resolution image signal VIDH and the low resolution image signal VIDL includes R, G, and B signals.

Figure 6:
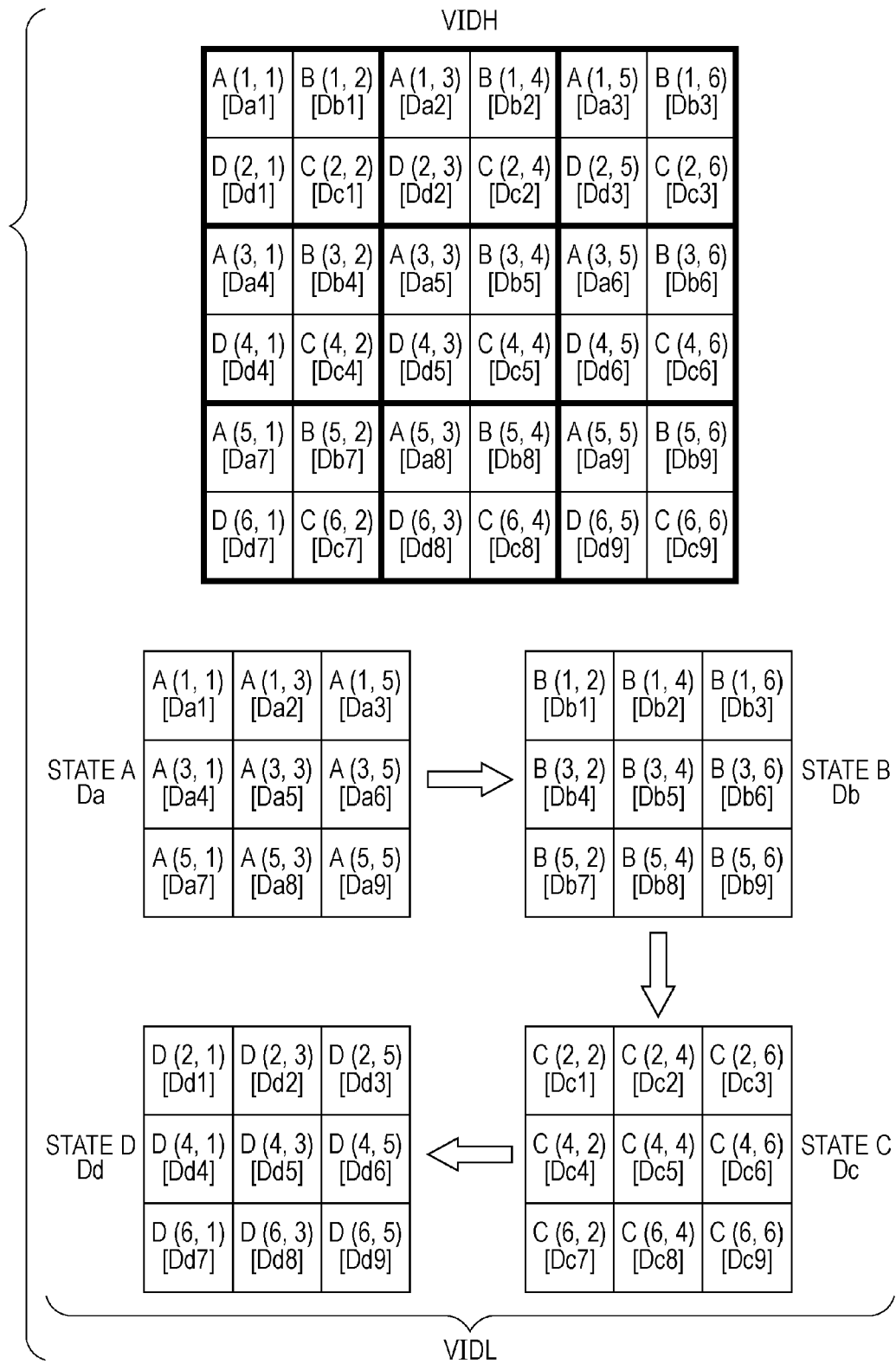
FIG. 6 is an explanatory diagram illustrating an example of a down-conversion process according to the first embodiment.

FIG. 6 illustrates an example of the down-conversion process. In the example, the down-conversion process, which is synchronized with the pixel shift states A to D, is performed. As illustrated in the drawing, it is assumed that the high resolution image signal VIDH is arranged with pixels which include 6 vertical rows×6 horizontal columns. The pixels are divided into blocks each having 2 vertical rows×2 horizontal columns which are expressed by a thick frame. Furthermore, in the pixel shift state A, upper left part elements of the respective blocks are selected. In the pixel shift state B, the upper right elements of the respective blocks are selected. In the pixel shift state C, lower right elements of the respective blocks are selected. In the pixel shift state D, lower left elements of the respective blocks are selected. Therefore, the low resolution image signal VIDL, in which the resolution of the high resolution image signal VIDH is reduced to ¼, is generated. In the description below, there is a case in which the low resolution image signal VIDL corresponding to the state A, the state B, the state C, or the state D is referred to as an image signal Da, Db, Dc, or Dd.

In addition, the high resolution image signal VIDH is 60 Hz, and the low resolution image signal VIDL is 960 Hz, which is 16 times greater than 60 Hz. This means that one screen of the low resolution image signal VIDL is displayed in each field which is acquired by dividing one frame of the high resolution image signal VIDH into 16 parts.

Figure 7:
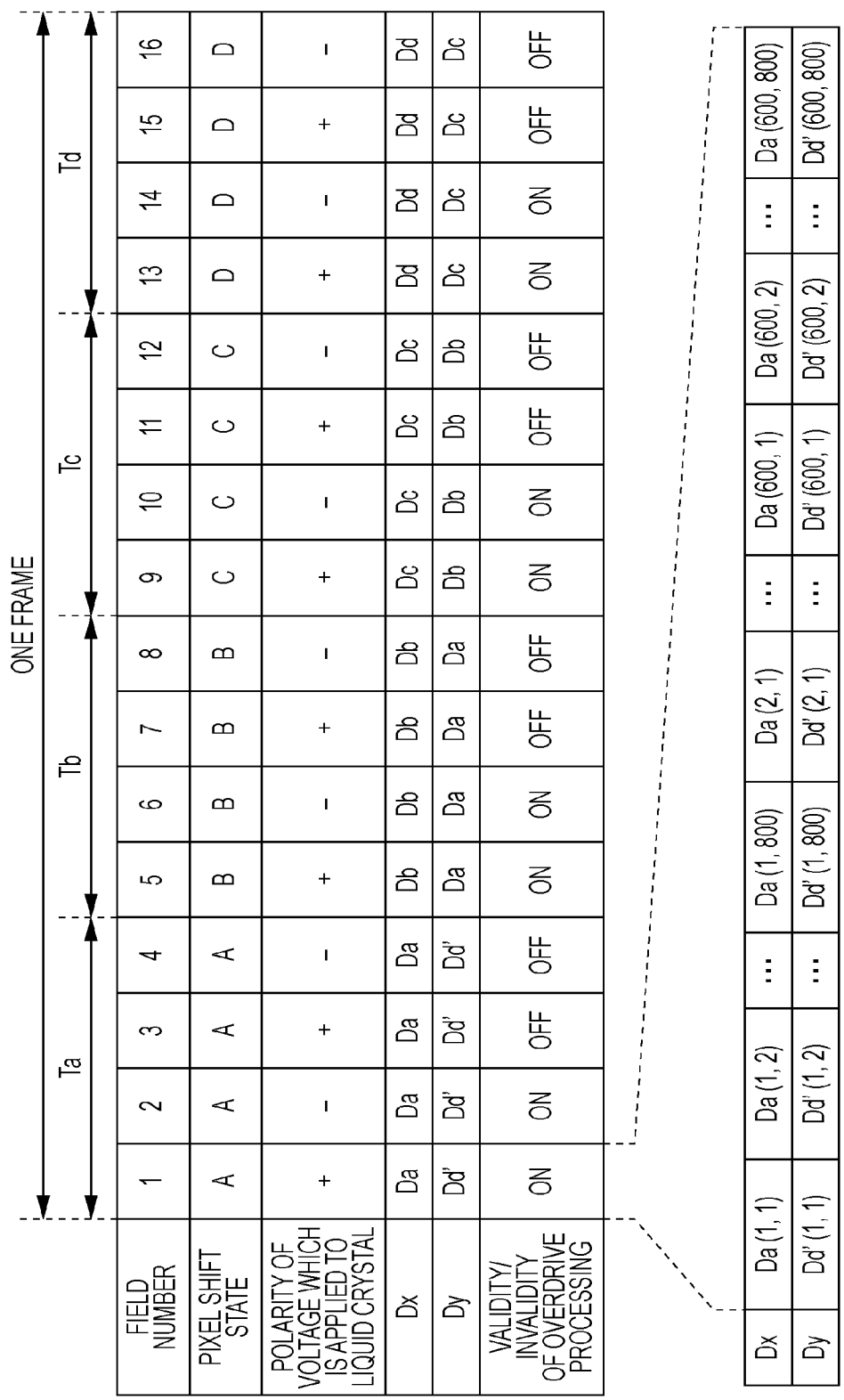
FIG. 7 is an explanatory diagram illustrating the relationship between a pixel shift state and each field according to the first embodiment.

FIG. 7 illustrates the relationship between the pixel shift state and each field. As illustrated in the drawing, one frame is divided into 16 fields. A part from a first field to a fourth field is a first unit period Ta in which the pixel shift enters the state A, a part from a fifth field to an eighth field is a second unit period Tb in which the pixel shift enters the state B, a part from a ninth field to a twelfth field is a third unit period Tc in which the pixel shift enters the state C, and a part from a thirteenth field to a sixteenth field is a fourth unit period Td in which the pixel shift enters the state D.

Figure 5:
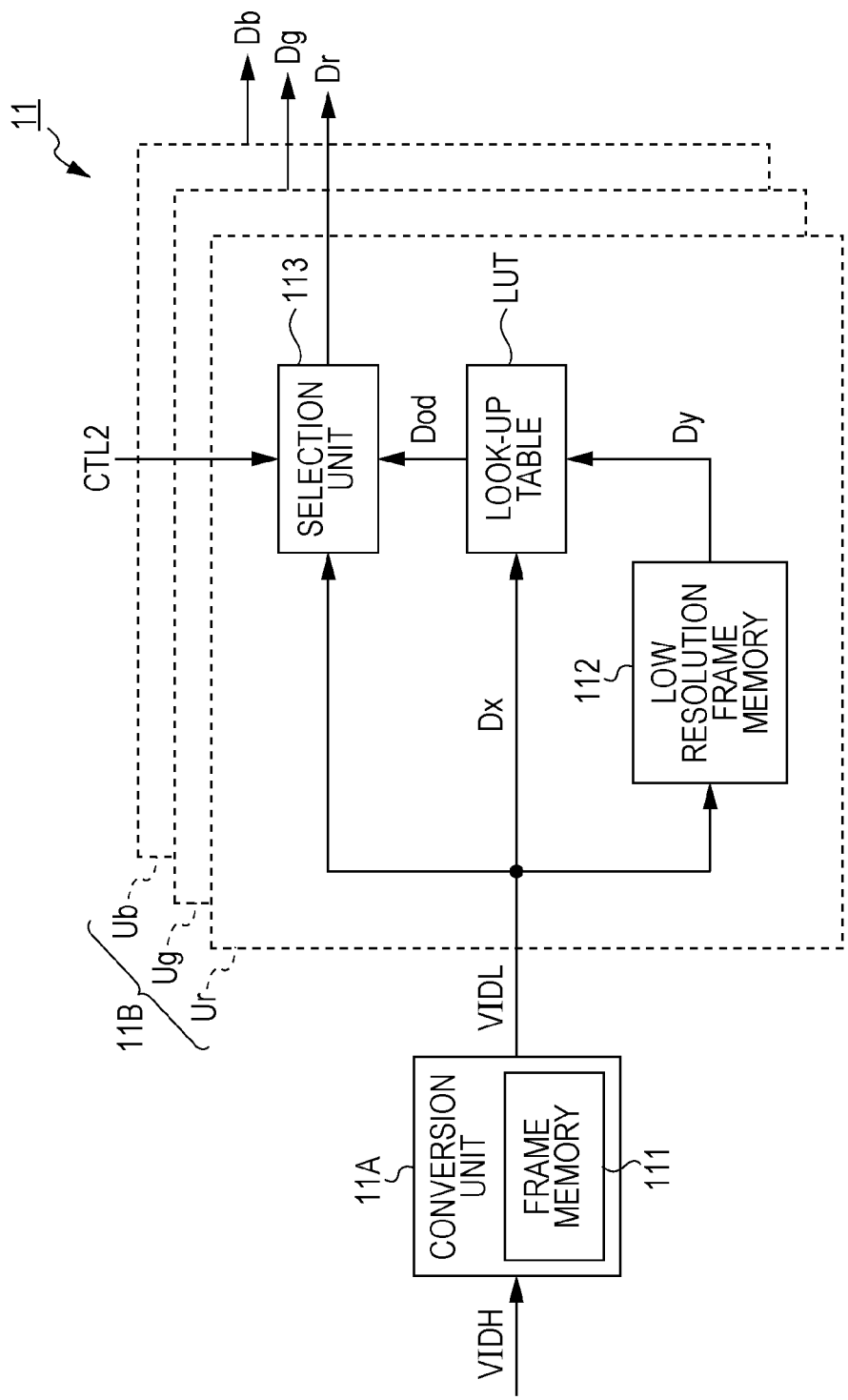
FIG. 5 is a block diagram illustrating an example of the configuration of an image processing unit according to the first embodiment.

The overdrive process unit 11B illustrated in FIG. 5 includes a processing unit Ur which processes the low resolution image signal VIDL of R, a processing unit Ug which processes the low resolution image signal VIDL of G, and a processing unit Ub which includes the low resolution image signal VIDL of B. Here, although the processing unit Ur will be described, the configuration of each of the processing units Ur, Ug, and Ub is the same.

The processing unit Ur includes a low resolution frame memory 112, a look-up table LUT, and a selection unit 113. The storage capacity of the low resolution frame memory 112 is smaller than the storage capacity of a storage region, which stores the high resolution image signal VIDH of R in the above-described frame memory 111, and the storage capacity of the low resolution frame memory 112 is ¼ of that of the storage region in the example. Meanwhile, the low resolution frame memory 112 may include a storage capacity which stores the low resolution image signal VIDL corresponding to at least one screen.

A current low resolution image signal VIDL and a past low resolution image signal VIDL, which is read from the low resolution frame memory 112, of one field period, are supplied to the look-up table LUT. In the description below, the current low resolution image signal VIDL is referred to as a first image signal Dx and the past low resolution image signal VIDL is referred to as a second image signal Dy.

In the look-up table LUT, an overdrive image signal Dod is associated with the first image signal Dx and the second image signal Dy, and is stored. That is, the image signal Dod is given by Equation below.

$$Dod = f(Dx, Dy)$$

A function f is determined by taking the response characteristics of liquid crystal into consideration such that desired grayscale is acquired. Therefore, there is compensation for the response characteristics of the liquid crystal panel of the electro-optical panel. Meanwhile, compensation means to improve the response characteristics. For example, in a case in which the response delay time of the liquid crystal panel is 10 ms, it is not necessary that the response delay time is 0 ms, and, if the response delay time of the liquid crystal panel is less than 10 ms, there is compensation for the response characteristics of the liquid crystal panel.

In the overdrive process, if grayscale indicated by the first image signal Dx is "100" and grayscale indicated by the second image signal Dy is "10", grayscale indicated by the image signal Dod is larger than "100". The reason for this is that, even when a voltage corresponding to the grayscale is applied to the liquid crystal, time is taken for response, and thus there is previous estimation of and compensation for the delay time of the liquid crystal panel. Therefore, the image signal Dod is set to grayscale which is larger than original grayscale "100". In contrast, if grayscale indicated by the first image signal Dx is "100" and grayscale indicated by the second image signal Dy is "100", grayscale indicated by the image signal Dod is "100". The reason for this is that compensation for the delay time of the liquid crystal panel is not necessary because the current grayscale is equal to the past grayscale.

As illustrated in FIG. 7, in the pixel shift states B to D, image signals Db to Dd, which are illustrated in FIG. 6, are supplied to the look-up table LUT as the first image signal Dx, and image signals Da to Dc of the frame are supplied as the second image signal Dy. Here, in the immediately before frame of the relevant frame, if the low resolution image signal VIDL in the pixel shift state D is expressed as an image signal Dd', the second image signal Dy is an image signal Dd' in the state A of the frame. More specifically, if an i-th row and a j-th row are expressed as (i, j), the first image signal Dx and the second image signal Dy in the first field are illustrated as in FIG. 7. That is, the overdrive process is performed based on the low resolution image signal VIDL (Dx) of a target pixel, which is the target of the overdrive process, and the low resolution image signal VIDL (Dy) of the target pixel in the immediately before pixel shift state. As described above, the low resolution frame memory 112 maintains the low resolution image signal VIDL corresponding to at least one screen, and thus it is possible to specify the low resolution image signal VIDL of the target pixel in the immediately before pixel shift state for a target pixel which is the target of the overdrive process.

Subsequently, the selection unit 113 illustrated in FIG. 5 selects the image signal Dod in a case in which the overdrive process is valid. In contrast, the selection unit 113 selects the first image signal Dx when the overdrive process is invalid, and generates an output image signal Dr. The validity and invalidity of the overdrive process are designated by the control signal CTL2. In the example, as illustrated in FIG. 7, the overdrive process is valid (ON) in the first field, the second field, the fifth field, the sixth field, the ninth field, the tenth field, the thirteenth field, and the fourteenth field, and the overdrive process is invalid (OFF) in the other fields. Meanwhile, in the fields in which the overdrive process is invalid, at least one of the reading of the second image signal Dy from the low resolution frame memory 112 and access to the look-up table LUT may be stopped. Therefore, it is possible to reduce power consumption.

In the example, each of the unit periods Ta, Tb, Tc, and Td includes four fields, and the polarity of a voltage which is applied to the liquid crystal is reversed in each field. Here, the polarity of the voltage to be applied is set to positive polarity (+) in a case in which the potential of the pixel electrode is high on the basis of the potential of the counter electrode, and is set to negative polarity (−) in a case in which the potential of the pixel electrode is low on the basis of the potential of the counter electrode. In the first two fields, which are included in each of the unit periods Ta to Td, the overdrive process is valid. The reason that the overdrive process is valid in the first half of the fields as above is to rapidly display desired grayscale.

A normal overdrive process is performed between the frames. However, in the embodiment, the overdrive process is performed in synchronization with the change of the pixel shift state. Therefore, it is possible to realize pseudo-high resolution due to the pixel shift, and it is possible to improve the response characteristics of the liquid crystal panel by performing the overdrive process.

In addition, when the pixel shift is combined with the overdrive process, it is possible to perform the overdrive process on the low resolution image signal VIDL. In the overdrive process, it is necessary to maintain a past signal but it is not necessary to store the high resolution image signal VIDH before the down-conversion process is performed, and the low resolution image signal VIDL may be stored. Therefore, it is possible to reduce the storage capacity of the memory.

Second Embodiment

In the above-described first embodiment, the past second image signal Dy for one field period is read from the low resolution frame memory 112 in the pixel shift states A to D. In a second embodiment, a pre-overdrive process is performed on the high resolution image signal VIDH and the overdrive process is performed on the low resolution image signal VIDL.

However, if a certain pixel (for example, B(3, 4)) is focused on as illustrated in FIG. 6 in transition from the state A to the state B in the pixel shift, a pixel which is displayed in an immediately before field is a left lateral pixel (for example, A(3, 3)). Subsequently, if a certain pixel (for example, C(4, 4)) is focused on in transition from the state B to the state C, a pixel which is displayed in the immediately before field is an upper pixel (for example, B(3, 4)). Subsequently, if a certain pixel (for example, D(4, 3)) is focused on in transition from the state C to the state D, a pixel which is displayed in an immediately before field is a right lateral pixel (for example, C(4, 4)). For these, in the high resolution image signal VIDH, the current image signal and the past image signal are present in the same frame, that is, a surface. In contrast, if a certain pixel (for example, A(3, 3)) is focused on in transition from the state D to the state A, a pixel which is displayed in an immediately before field is present in the one frame before the pixel, that is, out-of-plane.

In the second embodiment, in the transition from the state A to the state B, the transition from the state B to the state C, and the transition from the state C to the state D, the overdrive process is performed on the high resolution image signal VIDH. In the description below, the overdrive process, which is performed before the down-conversion process, is referred to as the pre-overdrive process.

In the example illustrated in FIG. 6, the high resolution image signal VIDH has a data value which changes in order of A(1, 1)→B(1, 2)→A(1, 3)→B(1, 4)→A(1, 5)→ B(1, 6) . . . D(2, 1)→C(2, 2)→D(2, 3)→C(2, 4)→D(2, 5)→C(2, 6) . . . D(6, 1)→C(6, 2)→D(6, 3)→C(6, 4)→C(6, 5)→C(6, 6)A. Here, if a pixel B(3, 4) of the state B is focused on, it is necessary to convert the data value of the pixel B(3, 4) based on the data value Db5 of the pixel B(3, 4) and the data value Da5 of the pixel A(3, 3) in order to perform the overdrive process on the pixel B(3, 4). If it is assumed that the data value which indicates the current high resolution image signal VIDH is the data value Db5 of the pixel B(3, 4), the data value Da5 of the pixel A(3, 3) is the data value of one dot before.

In addition, if the pixel C(4, 4) of the state C is focused on, it is necessary to convert the data value of the pixel C(4, 4) based on the data value Dc5 of the pixel C(4, 4) and the data value Db5 of the pixel B(3, 4) in order to perform the overdrive process on the pixel C(4, 4). If it is assumed that the data value which indicates the current high resolution image signal VIDH is the data value Dc5 of the pixel C(4, 4), the data value Db5 of the pixel B(3, 4) is a data value of one line before.

In addition, if the pixel D(4, 3) of the state D is focused on, it is necessary to convert the data value of the pixel D(4, 3) based on the data value Dd5 of the pixel D(4, 3) and the data value Dc5 of the pixel C(4, 4) in order to perform the overdrive process on the pixel D(4, 3). If it is assumed that the data value which indicates the current high resolution image signal VIDH is the data value Dd5 of the pixel D(4, 3), the data value Dc5 of the pixel C(4, 4) is a data value of one dot after.

That is, if it is possible to know one dot before, one line before, and one dot after data values on the basis of the current data value of the high resolution image signal VIDH, it is possible to perform the above-described pre-overdrive process.

Figure 8:
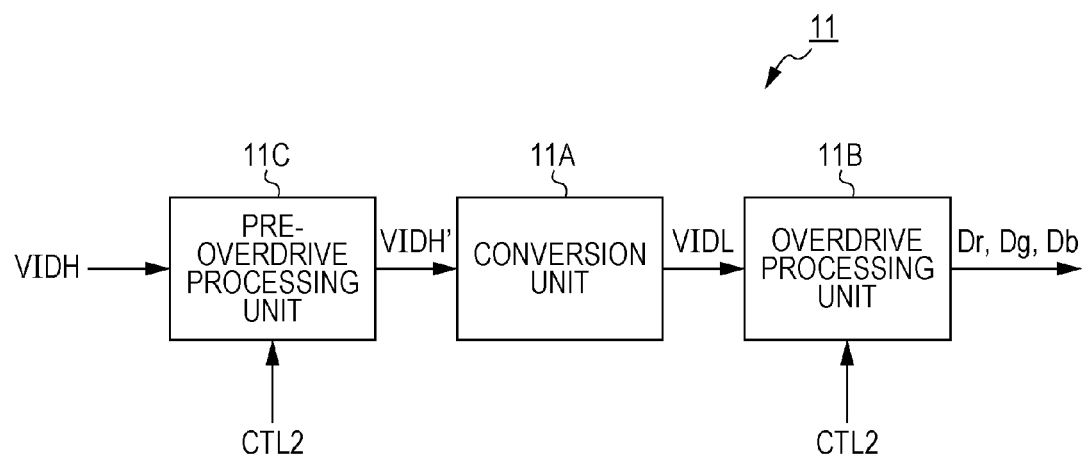
FIG. 8 is a block diagram illustrating an example of the configuration of an image processing unit according to a second embodiment.

FIG. 8 is a block diagram illustrating the image processing unit 11 which is used in the second embodiment. The image processing unit 11 according to the second embodiment has the same configuration as the image processing unit 11 according to the first embodiment illustrated in FIG. 5 except that a pre-overdrive process unit 11C is added to a fore stage of the conversion unit 11A and the operation of the selection unit 113.

The pre-overdrive process unit 11C generates a high resolution image signal VIDH' by performing the pre-overdrive process on the high resolution image signal VIDH in advance of the down-conversion process of the conversion unit 11A. The conversion unit 11A generates the low resolution image signal VIDL by performing the down-conversion process on the high resolution image signal VIDH'. However, the pre-overdrive process is already performed on the high resolution image signal VIDH' for the pixels B(1, 2) to B(5, 6), C(2, 2) to C(6, 6), and D(2, 1) to D(6, 5) which are illustrated in FIG. 6. Accordingly, the overdrive process unit 11B performs the overdrive process so far as a case in which the pixel shift is the state A. That is, the pre-overdrive process unit 11C and the overdrive process unit 11B exclusively operate.

Figure 9:
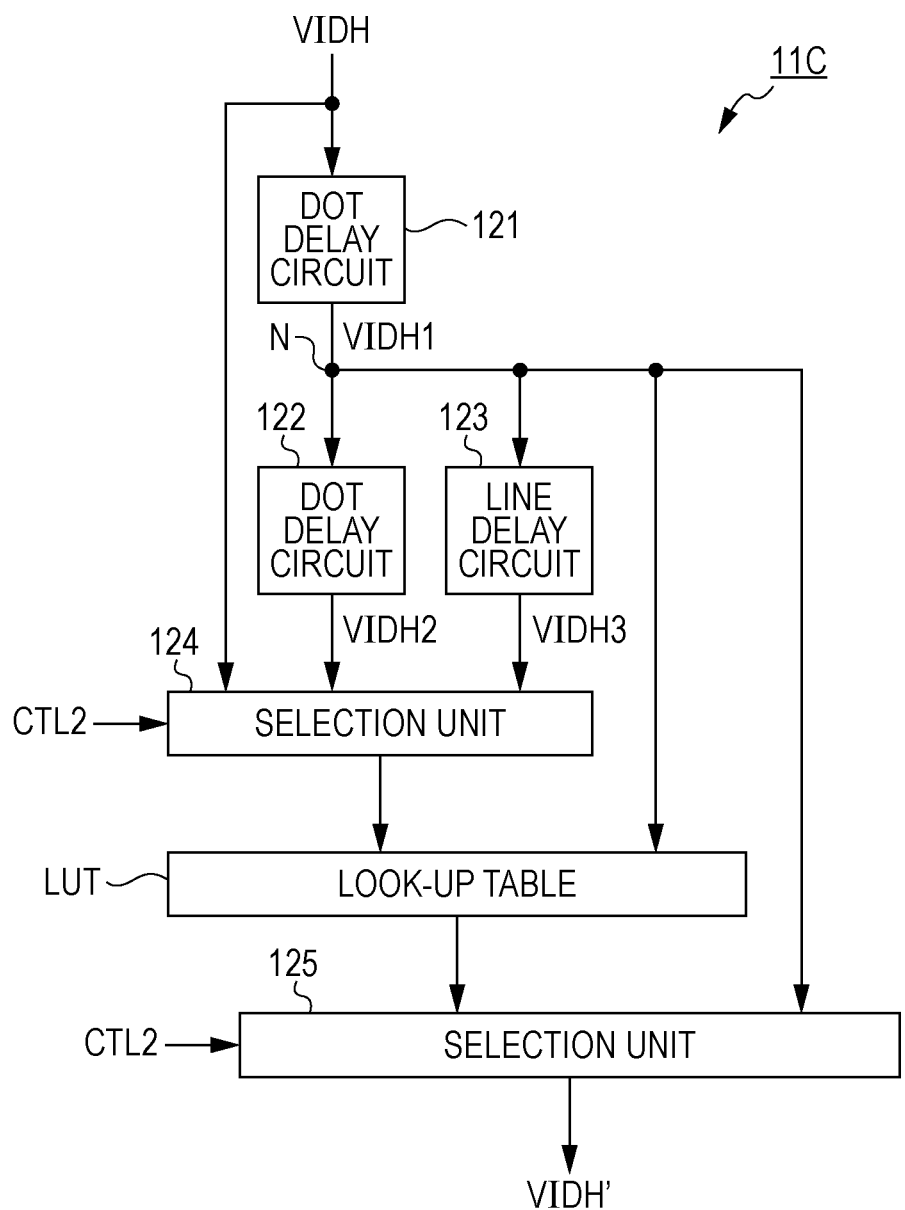
FIG. 9 is a block diagram illustrating an example of the configuration of a pre-overdrive process unit according to the second embodiment.

FIG. 9 illustrates the configuration of the pre-overdrive process unit 11C. As illustrated in the drawing, the pre-overdrive process unit 11C includes dot delay circuits 121 and 122, a line delay circuit 123, selection units 124 and 135, and a look-up table LUT. The dot delay circuits 121 and 122 are formed of, for example, a D flip-flop circuit functions as a latch using a dot clock signal and the delay time thereof is one period of the dot clock signal. In addition, the line delay circuit 123 is formed of, for example, a line memory and the delay time thereof is one horizontal scan period. Here, if it is assumed that the high resolution image signal VIDH1 of a node N is current, the high resolution image signal VIDH is a one dot after signal, and a high resolution image signal VIDH2 which is output from the dot delay circuit 122 is a one dot before signal, and a high resolution image signal VIDH3 is immediately before one line signal. Meanwhile, the dot clock signal in the example is synchronized with the high resolution image signal VIDH', one horizontal scan period is one horizontal scan period of the high resolution image signal VIDH'.

In a case of the pixel shift state B, the selection unit 124 selects a one dot before high resolution image signal VIDH2 in a case in which, for example, the current high resolution image signal VIDH1 includes the pixels B(1, 2) to B(5, 6) which are illustrated in FIG. 6. In addition, in a case of the pixel shift state C, the selection unit 124 selects a one line before high resolution image signal VIDH3 in a case in which, for example, the current high resolution image signal VIDH1 includes pixels C(2, 2) to C(6, 6). Further, in a case of the pixel shift state D, the selection unit 124 selects the high resolution image signal VIDH of one dot after in a case in which, for example, the current high resolution image signal VIDH1 includes the pixels D(2, 1) to D(6, 5).

That is, if it is assumed that a high resolution image signal corresponding to the low resolution image signal VIDL of the target pixel is the current high resolution image signal VIDH1, the selection unit 124 outputs a high resolution image signal corresponding to a low resolution image signal which indicates grayscale to be displayed on the target pixel in the immediately before pixel shift state.

The current high resolution image signal VIDH1 and the signal, which is selected by the selection unit 124, are supplied to the look-up table LUT. Content stored in the look-up table LUT is the same as that of the look-up table LUT illustrated in FIG. 5. Therefore, it is possible to perform the pre-overdrive process on the pixels B(1, 2) to B(5, 6), the pixels C(2, 2) to C(6, 6), and the pixels D(2, 1) to D(6, 5).

The selection unit 125 selects the current high resolution image signal VIDH1 in, for example, a period during which the current high resolution image signal VIDH1 indicates the data values of the pixels A(1, 1) to A(5, 5) in the case of the pixel shift state A, and selects the output signal of the look-up table LUT in the case of the pixel shift states B to D, thereby generating the high resolution image signal VIDH' on which the pre-overdrive process is performed.

Meanwhile, the selection units 124 and 125 select various signals based on the control signal CTL2 which indicates the pixel shift state. Therefore, it is possible to synchronize the pixel shift state with the pre-overdrive process.

The operation of the overdrive process unit 11B will be described with reference to FIG. 10. As illustrated in the drawing, the overdrive process is valid only in the first field and the second field in the first unit period Ta during which the pixel shift is the state A. The reason for this is that the compensation for the response characteristics of the liquid crystal is acquired by performing the pre-overdrive process in a case in which the pixel shift corresponds to the states B to D. Meanwhile, the pre-overdrive process is performed during one frame period, and the high resolution image signal VIDH' is stored in the frame memory 111 of the conversion unit 11A.

In order to perform the overdrive process in the first field and the second field, the low resolution image signal VIDL corresponding to one screen may be written one time into the low resolution frame memory 112 in any one of the thirteenth field to the sixteenth field of the fourth unit period Td.

As above, in the second embodiment, if the high resolution image signal VIDH', which is output from the pre-overdrive process unit 11C, is converted into the low resolution image signal VIDL in the conversion unit 11A, the pre-overdrive process unit 11C compensates for the response characteristics of the liquid crystal panel according to the pixel shift state so as to realize a state in which the overdrive process is performed on the output image signals Dr, Dg, and Db. Therefore, since the high resolution image signal VIDH', on which the in-plane overdrive process is performed in advance, is generated, the out-of-plane overdrive process may be performed in the overdrive process unit 11B. As a result, it is possible to reduce the capacity of the memory in the pre-overdrive process unit 11C and it is possible to decrease the number of accesses to the low resolution frame memory 112 in the overdrive process unit 11B, and thus it is possible to reduce power consumption.

Third Embodiment

In the above-described second embodiment, the in-plane pre-overdrive process and the out-of-plane overdrive process are performed. In contrast, a projector 1 according to a third embodiment performs only the pre-overdrive process.

The projector 1 according to the third embodiment has the same configuration as the projector 1 according to the second embodiment except the configuration of the image processing unit 11.

Figure 11:
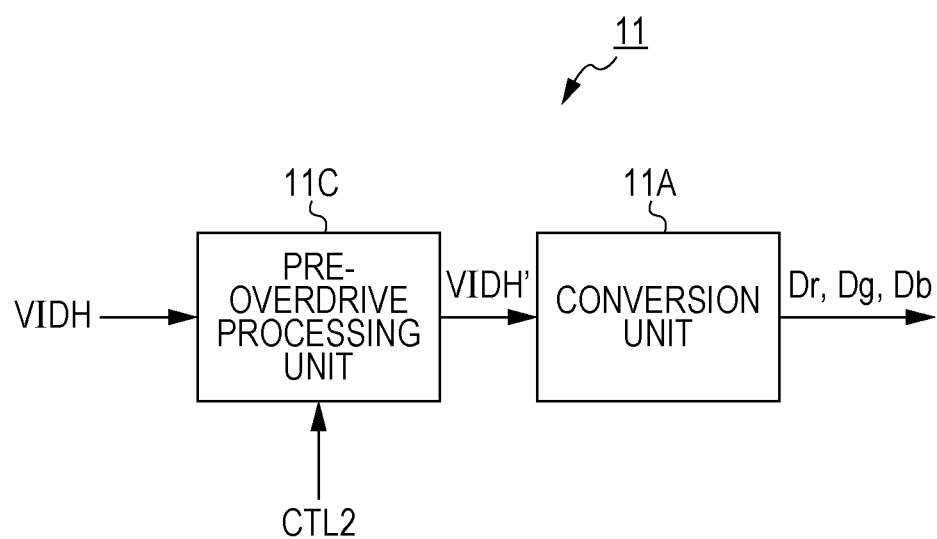
FIG. 11 is a block diagram illustrating an example of the configuration of an image processing unit according to a third embodiment.

FIG. 11 is a block diagram illustrating the configuration of the image processing unit 11 according to the third embodiment. As illustrated in the drawing, the image processing unit 11 according to the third embodiment includes the pre-overdrive process unit 11C and the conversion unit 11A. The configuration is the same as in the above-described second embodiment.

Accordingly, the image processing unit 11 according to the third embodiment does not perform out-of-plane overdrive process. That is, in the pixel shift states B to D illustrated in FIG. 6, the compensation for the response characteristics of the liquid crystal is performed. However, the compensation for the response characteristics of the liquid crystal is not performed in the state A.

According to the embodiment, since the out-of-plane overdrive process is not performed, it is possible to delete the low resolution frame memory 112 and it is possible to greatly reduce the memory capacity.

Fourth Embodiment

In the above-described first embodiment, the in-plane and the out-of-plane overdrive processes are performed in the overdrive process unit 11B. In contrast, a projector 1 according to a fourth embodiment uses an overdrive process unit 11D which performs only the in-plane overdrive process on the low resolution image signal VIDL. The projector 1 according to the fourth embodiment has the same configuration as that of the projector 1 according to the first embodiment except that the overdrive process unit 11D is used instead of the overdrive process unit 11B.

First, the principle of the in-plane overdrive process will be described with reference to FIG. 6. When the current pixel shift is the state B, originally, the data value Da5 of the pixel A(3, 3) is necessary in order to perform the overdrive process on the pixel B(3, 4). However, the pixel A(3, 3) is not present in-plane in the state B. In the high resolution image signal VIDH, the pixel B(3, 2) is positioned in the left lateral of the pixel A(3, 3) and the pixel B(3, 4) is positioned in the right lateral of the pixel A(3, 3). Here, it is possible to estimate the data value Da5 of the pixel A(3, 3) by the average value between the data value Db4 of the pixel B(3, 2) and the data value Db5 of the pixel B(3, 4). That is, in a case in which a pixel on which the overdrive process to be performed is a pixel B(i, j+1), the data value Da of a pixel A(i, j) is calculated by the average value between the data value Db of a pixel B(i, j−1) and the data value Db of a pixel B(i, j+1).

In addition, in a case in which the current pixel shift is the state C, originally, the data value Db5 of the pixel B(3, 4) is necessary in order to perform the overdrive process on the pixel C(4, 4). However, the pixel B(3, 4) is not present in-plane in the state C. In the high resolution image signal VIDH, the pixel C(2, 4) is positioned on the pixel B(3, 4) and the pixel C(4, 4) is positioned under the pixel B(3, 4). Here, it is possible to estimate the data value Db5 of the pixel B(3, 4) by the average value between the data value Dc2 of the pixel C(2, 4) and the data value Dc5 of the pixel C(4, 4). That is, the data value Db of a pixel B(i, j) is calculated by the average value between the data value Dc of a pixel C(i−1, j) and the data value Dc of the pixel C(i+1, j).

In addition, in a case in which the current pixel shift is the state D, originally, the data value Dc5 of the pixel C(4, 4) is necessary in order to perform the overdrive process on the pixel D(4, 3). However, the pixel C(4, 4) is not present in-plane in the state D. In the high resolution image signal VIDH, the pixel D(4, 3) is positioned in the left lateral of the pixel C(4, 4), and the pixel D(4, 5) is positioned in the right lateral of the pixel C(4, 4). Here, it is possible to estimate the data value Dc5 of the pixel C(4, 4) by the average value between the data value Dd5 of the pixel D(4, 3) and the data value Dd6 of the pixel D(4, 5). That is, the data value Dc of the pixel C(i, j) is calculated by the average value between the data value Dd of a pixel D(i, j−1) and the data value Dd of a pixel D(i, j+1).

In addition, in a case in which the current pixel shift is the state A, the data value Dd5 of the pixel D(4, 3) of the immediately before frame is necessary in order to perform the overdrive process on the pixel A(3, 3). For the state A, estimation which spans the frames is performed, and thus there is a possibility that error become large. Therefore, in the embodiment, the overdrive process is not performed.

Figure 12:
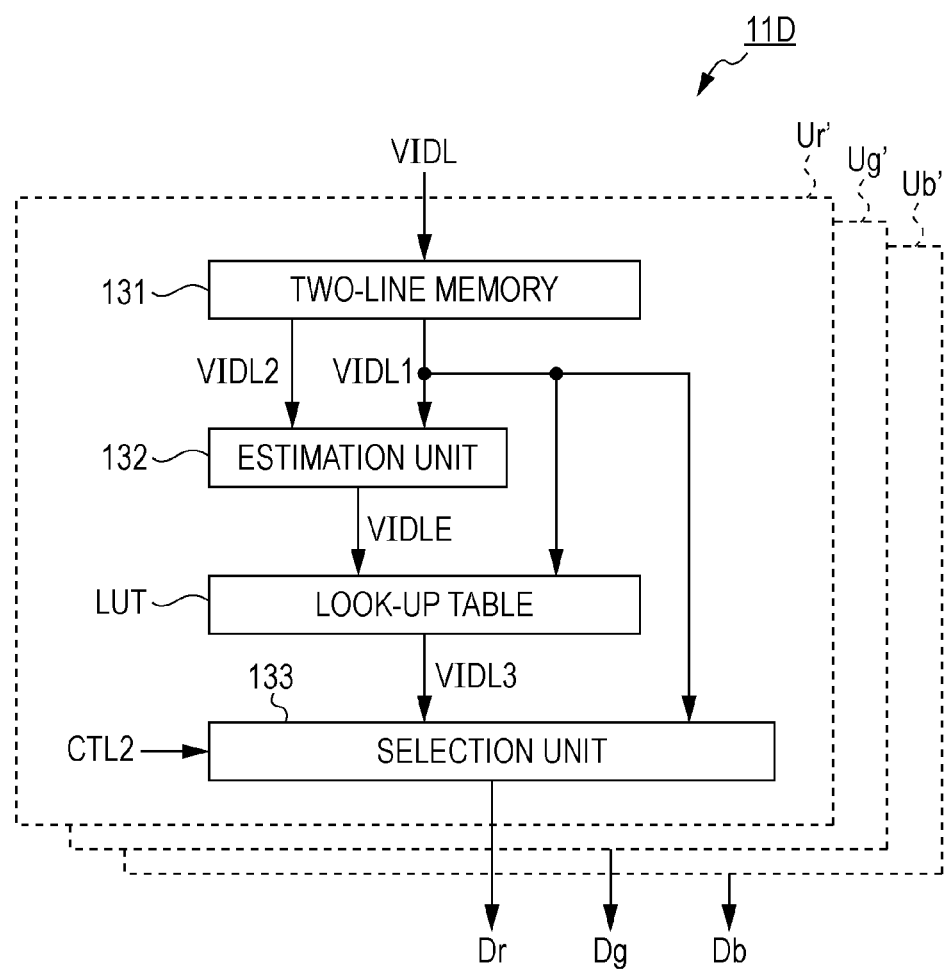
FIG. 12 is a block diagram illustrating an example of the configuration of an overdrive process unit according to a fourth embodiment.

FIG. 12 is a block diagram illustrating the configuration of the overdrive process unit 11D according to the fourth embodiment. As illustrated in the drawing, the overdrive process unit 11D includes a processing unit Ur' which processes the low resolution image signal VIDL of R color, a processing unit Ug' which processes the low resolution image signal VIDL of G color, and a processing unit Ub' which processes the low resolution image signal VIDL of B color. Here, although the processing unit Ur' will be described, each of the processing units Ur', Ug', and Ub' have the same configuration.

The processing unit Ur' includes a two-line memory 131 which stores the low resolution image signals VIDL corresponding to two lines. A low resolution image signal VIDL1, which indicates the data value of a current pixel, is read from the two-line memory 131 and is supplied to an estimation unit 132 and a selection unit 133.

In addition, a low resolution image signal VIDL2, which is read from the two-line memory 131, indicates the data value of a pixel which is present in-plane that is necessary to estimate the data value of the pixel in the immediately before pixel shift state corresponding to the current pixel.

More specifically, in a case in which the low resolution image signal VIDL1 indicates the data value of a pixel B(i, j) in the pixel shift state B, the low resolution image signal VIDL2 indicates the data value of a pixel B(i, j−2).

In addition, in a case in which the low resolution image signal VIDL1 indicates the data value of a pixel C(i, j) in the pixel shift state C, the low resolution image signal VIDL2 indicates the data value of the pixel C(i−2, j).

In addition, in a case in which the low resolution image signal VIDL1 indicates the data value of a pixel D(i, j) in the pixel shift state D, the low resolution image signal VIDL2 indicates the data value of a pixel D(i, j+2).

That is, when it is assumed that a target pixel, which is the target of the overdrive process, is the pixel B(i, j), the pixel B(i, j−2) is a pixel around the target pixel. When it is assumed that a target pixel, which is the target of the overdrive process, is the C(i, j), the pixel C(i−2, j) is the pixel around the target pixel. When it is assumed that a target pixel, which is the target of the overdrive process, is the pixel D(i, j), the pixel D(i, j+2) is the pixel around the target pixel.

The estimation unit 132 generates an estimated low resolution image signal VIDLE, which indicates grayscale to be displayed on the target pixel which is the target of the overdrive process, in the immediately before pixel shift state based on the low resolution image signal VIDL1, which is read from the two-line memory 131 and is the target pixel that is the target of the overdrive process, and the low resolution image signal VIDL2 of the pixel around the target pixel. More specifically, the estimation unit 132 calculates the average value between the low resolution image signal VIDL1 and the low resolution image signal VIDL2, and supplies the average value to the look-up table LUT as the estimated low resolution image signal VIDLE. The storage content of the look-up table LUT is the same as that of the look-up table LUT illustrated in FIG. 5.

The selection unit 133 selects a low resolution image signal VIDL3 which is output from the look-up table LUT in a case in which the overdrive process is performed based on the control signal CTL2, and selects the low resolution image signal VIDL1 in a case in which the overdrive process is not performed. Specifically, as illustrated in FIG. 13, the selection unit 133 selects the low resolution image signal VIDL1 in the first unit period Ta during which the pixel shift is the state A. In addition, the selection unit 133 selects the low resolution image signal VIDL1 in the seventh field, the eighth field, and the eleventh field, the twelfth field from among the second to fourth unit periods Tb to Td during which the pixel shift is states B to D.

In contrast, the selection unit 133 selects the low resolution image signal VIDL3 in the fifth field, the sixth field, the ninth field, the tenth field, the thirteenth field, and the fourteenth field from among the second to fourth unit periods Tb to Td during which the pixel shift is the states B to D. In this manner, the output image signal Dr is generated.

In the embodiment, the overdrive process is performed in-plane, and thus the frame memory is not necessary. Accordingly, it is possible to simplify the configuration of the projector 1.

Modification Example

Hereinabove, the embodiments of the invention are described. However, modifications, which will be described blow, may be added to the embodiments. In addition, each of the modification examples and each of the above-described embodiments may be appropriately combined.

First Modification Example

In the above-described embodiments, the pixel shift in the four directions is described as an example of the pixel shift. However, the invention is not limited thereto, and it is apparent that the invention can be applied to a case in which the pixel shift is performed in one or more directions.

Second Modification Example

In each of the above-described embodiments, the transition between the pixel shift states in each of the frames is the same as in the state A→the state B→the state C→the state D. However, the sequence of the transition may be changed. For example, the sequence may be realized in order of the state A→the state B→the state C→the state D in the first frame, the state B→the state C→the state D→the state A in the second frame, the state C→the state D→the state A→the state B in the third frame, and the state D→the state A→the state B→the state C in the fourth frame.

If the transition between the pixel shift states is changed in each of the frames as above, in the third embodiment in which the in-plane pre-overdrive process is performed and the out-of-plane overdrive process is not performed, it is possible to disperse pixels on which the pre-overdrive process is not performed, and thus it is possible to improve image quality.

In addition, it is possible to disperse the pixels on which the overdrive process is not performed in the fourth embodiment in the same manner, and thus it is possible to improve image quality.

Third Modification Example

In the above-described second embodiment, as illustrated in FIG. 9, the current high resolution image signal VIDH1 is extracted from the node N, the high resolution image signal VIDH of one dot after the fore stage of the dot delay circuit 121 is extracted, the high resolution image signal VIDH2 of one dot before the latter stage of the dot delay circuit 122 is extracted, and the high resolution image signal VIDH3, which is subsequent to one line of the latter stage of the line delay circuit 123 is extracted. However, the invention is not limited thereto. A storage unit, which stores the high resolution image signals VIDH corresponding to two lines, may be provided, and the high resolution image signals of the current, the one dot after, the one dot before, and the one line before may be extracted. The storage capacity of the high resolution image signal of this case is smaller than the storage capacity of the high resolution image signal corresponding to one screen, and thus it is possible to simplify the configuration.

In addition, in the above-described second embodiment, the pre-overdrive process unit 11C performs the pre-overdrive process using the in-plane high resolution image signal VIDH and the overdrive process unit 11B performs the overdrive process using the out-of-plane low resolution image signal VIDL. However, the invention is not limited thereto. The processing load may be appropriately divided to the pre-overdrive process unit 11C and the overdrive process unit 11B. That is, the overdrive process may be performed on pixels other than the target pixel on which the pre-overdrive process is performed.

Fourth Modification Example

In the above-described fourth embodiment, the overdrive process is invalid in the pixel shift state A. However, the overdrive process may be valid in the pixel shift state A. In this case, estimation in which frames are spanned is performed, and thus estimation errors are large. However, in a case in which, for example, still images are displayed, grayscale is not changed between the frames, and thus the pixel shift states B to D have the same estimation errors.

Fifth Modification Example

In each of the above-described embodiment, the liquid crystal panel which includes liquid crystal is described as an example. However, the invention is not limited thereto. It is apparent that the invention may be applied to an electro-optic apparatus which includes an electro-optical panel having an electro-optical material in which an optical characteristic changes due to electrical energy.

In addition, in each of the above-described embodiments, the high resolution image signal VIDH is an image of 1600 horizontal pixels×1200 vertical pixels, and the low resolution image signal VIDL is an image of 800 horizontal pixels×600 vertical pixels. However, the invention is not limited thereto. For example, the high resolution image signal VIDH may be an image of 1920 horizontal pixels× 1080 vertical pixels.

This application claims priority to Japan Patent Application No. 2015-120610 filed Jun. 15, 2015, the entire disclosures of which are hereby incorporated by reference in their entireties.

What is claimed is:

1. An electro-optic apparatus comprising:
   an electro-optical panel in which a plurality of pixels are arranged;
   an optical path shifting element that is capable of changing an optical path of light which is emitted from the electro-optical panel;
   an optical path shifting element drive unit that drives the optical path shifting element such that, when one frame period of a high resolution image signal is divided into a plurality of unit periods which include a first unit period and a second unit period subsequent to the first unit period, and when it is assumed that a pixel shift state in which light emitted from a predetermined pixel of the electro-optical panel reaches a first position of a display screen is set to a first state and a pixel shift state in which light reaches a second position that is different from the first position of the display screen is set to a second state, the optical path shifting element enters the first state in the first unit period and enters the second state in the second unit period; and
   an image processing unit that converts the high resolution image signal into a low resolution image signal, and generates an output image signal which controls the plurality of pixels according to the low resolution image signal,
   wherein the image processing unit performs an overdrive process which compensates for response characteristics of the electro-optical panel according to the pixel shift state, and generates the output image signal.

2. The electro-optic apparatus according to claim 1,
   wherein the image processing unit includes
   a conversion unit that generates the low resolution image signal by performing conversion on the high resolution image signal; and
   an overdrive process unit that includes a low resolution image signal storage unit which stores the low resolution image signal output from the conversion unit, and generates the output image signal, on which the overdrive process is performed, based on the low resolution image signal of the target pixel which is the target of the overdrive process and the low resolution image signal of the target pixel in an immediately before pixel shift state which is read from the low resolution image signal storage unit, and wherein a storage capacity of the low resolution image signal storage unit is smaller than a storage capacity for storing the high resolution image signal corresponding to one screen.

3. The electro-optic apparatus according to claim 2, wherein the low resolution image signal storage unit includes the storage capacity for storing the low resolution image signal corresponding to at least one screen.

4. The electro-optic apparatus according to claim 1, wherein the image processing unit includes the conversion unit that generates the low resolution image signal by performing conversion on the high resolution image signal; and the overdrive process unit that performs the overdrive process, wherein the overdrive process unit includes the low resolution image signal storage unit which stores the low resolution image signal output from the conversion unit; and an estimation unit that generates an estimated low resolution image signal which is read from the low resolution image signal storage unit and indicates grayscale to be displayed on the target pixel which is the target of the overdrive process in the immediately before pixel shift state based on the low resolution image signal of the target pixel which is the target of the overdrive process and the low resolution image signal of a pixel around the target pixel, wherein the overdrive process unit generates the output image signal on which the overdrive process is performed based on the estimated low resolution image signal and the low resolution image signal of a current target pixel, and wherein a storage capacity of the low resolution image signal storage unit is smaller than a storage capacity for storing the high resolution image signal corresponding to one screen.

5. The electro-optic apparatus according to claim 1, wherein the image processing unit includes a pre-overdrive process unit that performs a pre-overdrive process on the high resolution image signal; and a conversion unit that converts the high resolution image signal which is output from the pre-overdrive process unit into the low resolution image signal, and wherein the pre-overdrive process is a process that is performed based on the high resolution image signal corresponding to the low resolution image signal of the target pixel and the high resolution image signal corresponding to the low resolution image signal which indicates grayscale to be displayed on the target pixel in the immediately before pixel shift state, and that is performed, if the high resolution image signal output from the pre-overdrive process unit is converted into the low resolution image signal in the conversion unit, to compensate for the response characteristics of the electro-optical panel according to the pixel shift state such that the pixel shift state enters a state in which the overdrive process is performed on the output image signal.

6. The electro-optic apparatus according to claim 1, wherein the image processing unit includes a pre-overdrive process unit that performs a pre-overdrive process on the high resolution image signal;

a conversion unit that converts the high resolution image signal output from the pre-overdrive process unit into the low resolution image signal; and an overdrive process unit that performs the overdrive process on the low resolution image signal output from the conversion unit, wherein the pre-overdrive process is a process that is performed based on the high resolution image signal corresponding to the low resolution image signal of the target pixel and the high resolution image signal corresponding to the low resolution image signal which indicates grayscale to be displayed on the target pixel in the immediately before pixel shift state, and that is performed, if the high resolution image signal output from the pre-overdrive process unit is converted into the low resolution image signal in the conversion unit, to generate the high resolution image signal such that the output image signal, in which there is compensation for the response characteristics of the electro-optical panel according to the pixel shift state, is acquired, and wherein the overdrive process is performed to generate the output image signal by compensating for the response characteristics of the electro-optical panel according to the pixel shift state based on the low resolution image signal of a pixel other than the target pixel and the low resolution image signal of the pixel in the immediately before pixel shift state.

7. A method of controlling an electro-optic apparatus which includes an electro-optical panel in which a plurality of pixels are arranged, and an optical path shifting element that is capable of changing an optical path of light which is emitted from the electro-optical panel, the method comprising:

driving the optical path shifting element such that, when one frame period of a high resolution image signal is divided into a plurality of unit periods which include a first unit period and a second unit period subsequent to the first unit period, and when it is assumed that a pixel shift state in which light emitted from a predetermined pixel of the electro-optical panel reaches a first position of a display screen is set to a first state and a pixel shift state in which light reaches a second position that is different from the first position of the display screen is set to a second state, the optical path shifting element enters the first state in the first unit period and enters the second state in the second unit period;

converting the high resolution image signal into a low resolution image signal; and generating an output image signal which controls the plurality of pixels by performing an overdrive process which compensates for a response characteristic of the electro-optical panel on the low resolution image signal according to the pixel shift state.

* * * * *